US011800676B2

(12) United States Patent
Kedlaya et al.

(10) Patent No.: US 11,800,676 B2
(45) Date of Patent: Oct. 24, 2023

(54) SYSTEM AND METHOD FOR SECURE MANAGEMENT OF A RACK

(71) Applicant: HEWLETT PACKARD ENTERPRISE DEVELOPMENT LP, Houston, TX (US)

(72) Inventors: Naveena Kedlaya, Bangalore (IN); Bindu Loganathan, Bangalore (IN); Sharath Karkada Srinivasa, Bangalore (IN); Rekha G, Bangalore (IN); Varsha Anandani, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 663 days.

(21) Appl. No.: 16/779,495

(22) Filed: Jan. 31, 2020

(65) Prior Publication Data
US 2021/0243912 A1  Aug. 5, 2021

(51) Int. Cl.
*H05K 7/14* (2006.01)
*G06F 9/54* (2006.01)
*G08B 25/00* (2006.01)

(52) U.S. Cl.
CPC ........... *H05K 7/1498* (2013.01); *G06F 9/542* (2013.01); *G08B 25/00* (2013.01)

(58) Field of Classification Search
None
See application file for complete search history.

(56) References Cited

U.S. PATENT DOCUMENTS

| 10,171,309 | B1 | 1/2019 | Smith et al. | |
| 2004/0088293 | A1* | 5/2004 | Daggett | G06F 16/221 |
| 2006/0023384 | A1 | 2/2006 | Mukherjee et al. | |
| 2006/0218326 | A1 | 9/2006 | Tanaka | |
| 2007/0204332 | A1* | 8/2007 | Pan | G06F 21/71 726/5 |
| 2011/0047263 | A1 | 2/2011 | Martins et al. | |
| 2011/0187503 | A1 | 8/2011 | Costa et al. | |

(Continued)

OTHER PUBLICATIONS

Edwards et al., "Gen-Z Component Authentication: Foundation for a Secured Infrastructure", Gen-Z, 2019, pp. 1-4.

*Primary Examiner* — Charles E Anya
(74) *Attorney, Agent, or Firm* — Mauriel Kapouytian Woods LLP

(57) ABSTRACT

Example implementations relate to method and controller for secure management of a rack. The method includes generating a first unique identifier corresponding to a rack profile of the rack hosting rack devices including physical devices and logical devices, in accordance with a rack topology, wherein the rack profile is based on configuration of the rack devices and the rack topology. Further, the method includes receiving information corresponding to the rack profile of the rack from peripheral devices disposed in the rack, wherein the information is based on monitored condition of the rack devices and the rack topology. The method further includes generating a second unique identifier based on the information, and determining variation in the rack profile based on comparison of the first and second unique identifiers. Further, the method includes generating an alert signal in the rack, in response to determination of the variation in the rack profile.

20 Claims, 7 Drawing Sheets

(56) References Cited

U.S. PATENT DOCUMENTS

| | | | |
|---|---|---|---|
| 2012/0155323 A1* | 6/2012 | Ramachandran | H04L 45/563 370/254 |
| 2014/0277784 A1 | 9/2014 | Mick et al. | |
| 2014/0281614 A1* | 9/2014 | Mick | G05D 23/1917 713/320 |
| 2015/0081878 A1* | 3/2015 | Pabba | H04L 41/0213 709/224 |
| 2015/0350035 A1 | 12/2015 | Bertram et al. | |
| 2016/0321486 A1* | 11/2016 | Chhuor | H05K 7/1498 |
| 2017/0010652 A1* | 1/2017 | Huang | G06F 1/3234 |
| 2018/0026800 A1 | 1/2018 | Munoz et al. | |
| 2018/0116071 A1 | 4/2018 | Stevens et al. | |
| 2018/0262722 A1* | 9/2018 | Li | H04N 7/185 |
| 2018/0285607 A1 | 10/2018 | Chojnacki | |
| 2018/0337931 A1* | 11/2018 | Hermoni | H04L 67/51 |
| 2019/0182179 A1* | 6/2019 | Pak | H04L 49/10 |
| 2019/0197127 A1* | 6/2019 | Lin | G06F 3/0689 |

* cited by examiner

SYSTEM AND METHOD FOR SECURE MANAGEMENT OF A RACK

BACKGROUND

Management station, such as asset management station and data center management station may be used to monitor and maintain rack devices hosted in a rack of a data center. For example, the rack devices may include servers, modems, storage systems, routers, and other equipment, such as power, cooling, and cable management resources, among others. A rack enclosure provides standardized structure to support and mount the rack devices inside the rack enclosure.

BRIEF DESCRIPTION OF THE DRAWINGS

Various examples will be described below with reference to the following figures.

Figure 1:
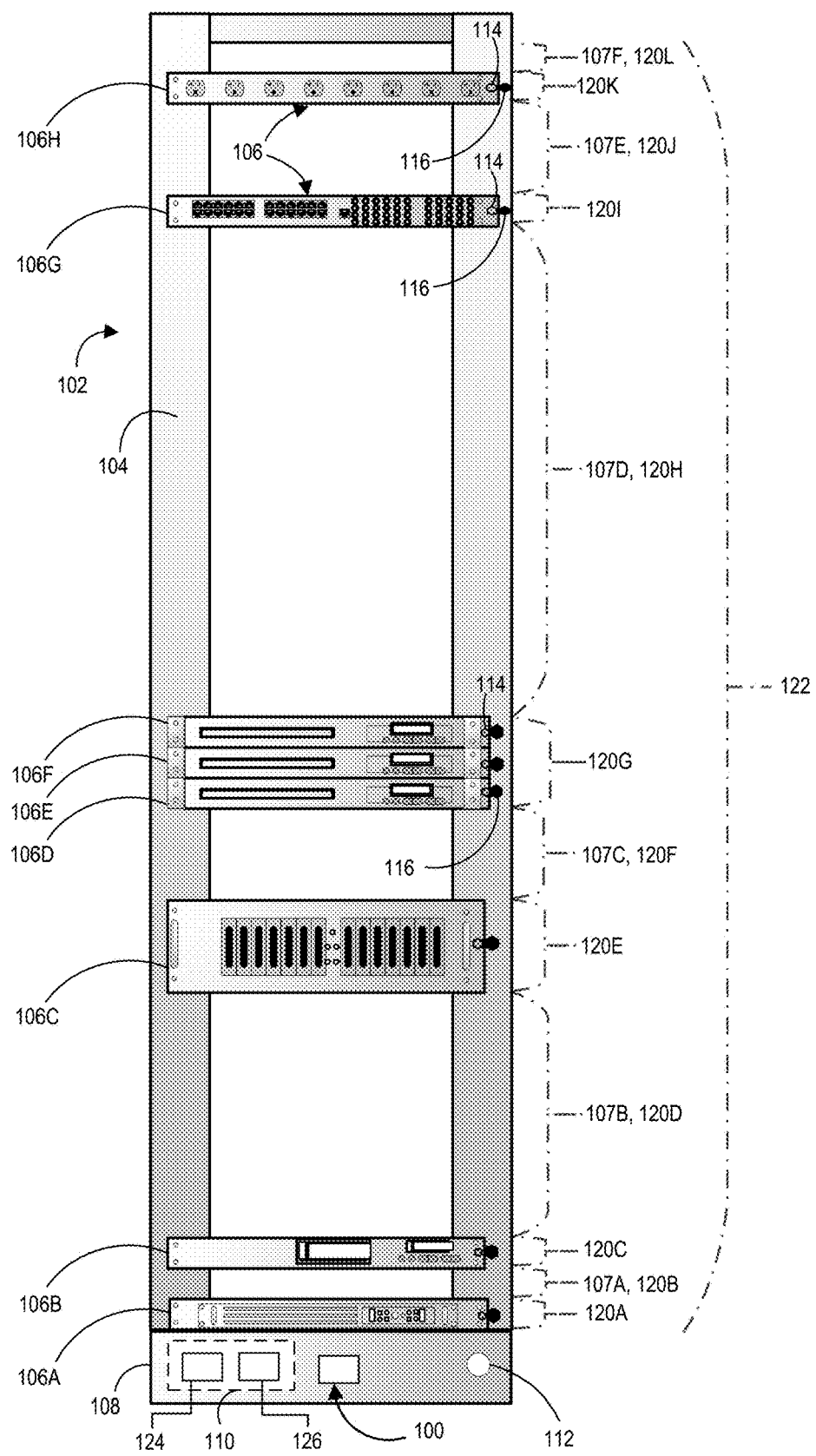
FIG. 1 is a block diagram depicting a controller disposed within a rack hosting a plurality of rack devices, in accordance with embodiments of the present disclosure.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. As used herein, the term "includes" means includes but not limited to, the term "including" means including but not limited to. The term "based on" means based at least in part on.

The present disclosure relates generally to a rack management and, more specifically, to method and system for secure management of a rack hosting a plurality of rack devices including physical devices and logical devices, in accordance with a rack topology. In some example embodiments, the system, for example, a controller may secure the rack both during transit and operational phases of the rack, by generating alert signals in case of any variation to a base configuration (rack profile) of the rack. In some other examples, the controller may deny power supply to the rack in response to determination of any variation to the base configuration. Additionally, the controller may communicate the alert signals to a management station to fix the variations in what is being monitored and managed by the management station. Thus, the present disclosure provides an effective technical solution to maintain integrity of the rack that is shipped from factory to customer premises, maintain the integrity of the rack during operational phase of the rack in the customer premises, and keep the rack information in sync in both data center management station and asset management station. The disclosed examples may include systems, devices, computer-readable storage media, and methods to generate a first unique identifier corresponding to a base configuration of the rack, generate a second unique identifier corresponding to a monitored condition of the rack, and compare the first and second unique identifiers to determine any variation in the rack profile. Accordingly, certain examples are described with reference to the components illustrated in FIGS. 1-7. The functionality of the illustrated components may overlap, however, and may be present in a fewer or greater number of elements and components.

Figure 7:
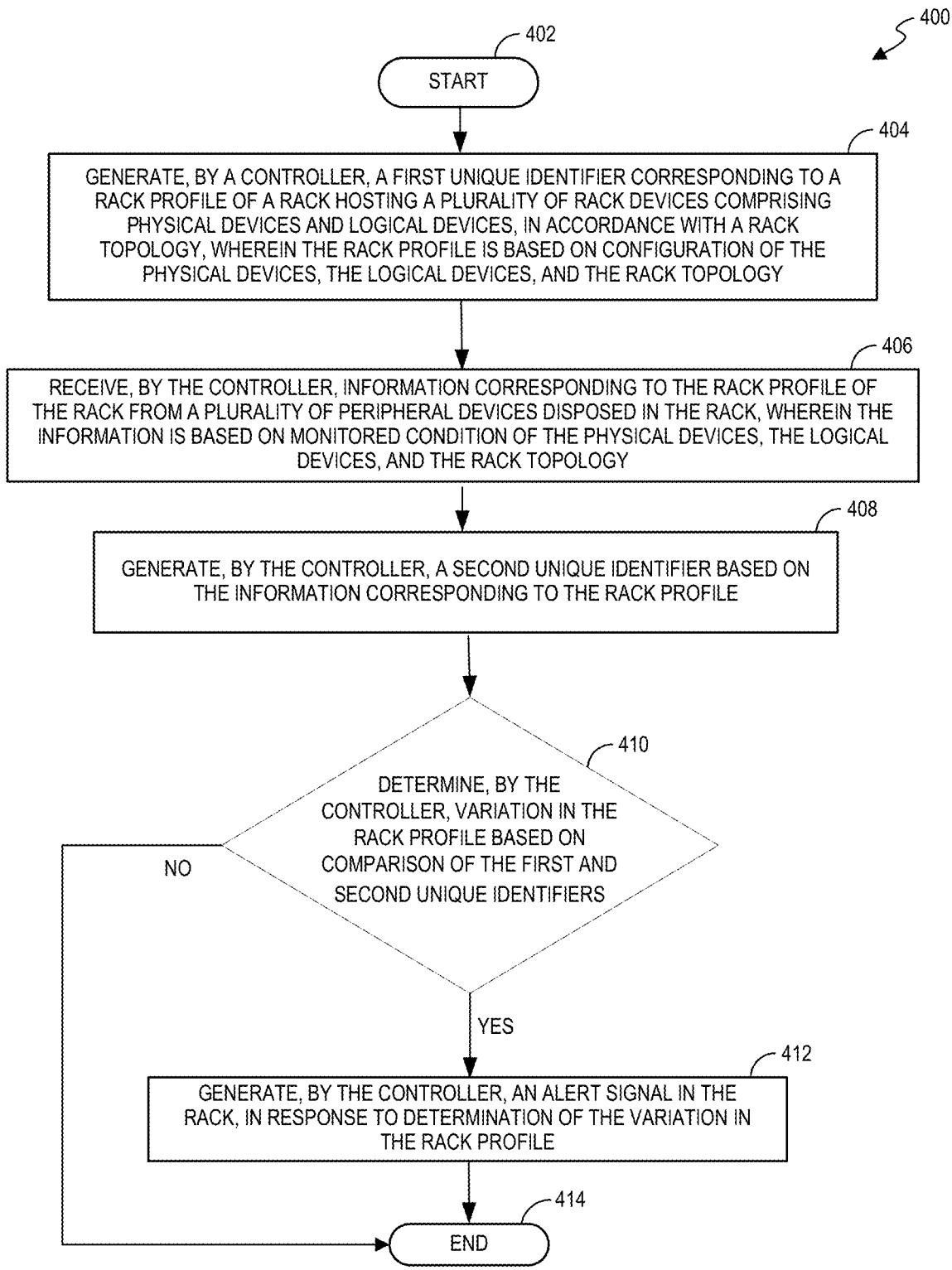
FIG. 7 is a flow diagram depicting an example method for secure management of a rack, in accordance with embodiments of the present disclosure.

The sequence of operations described in connection with FIG. 7 is example and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Such modifications and variations are intended to be included within the scope of this disclosure and protected by the following claims.

Typically, rack includes a metal frame to provide standardized structure to mount various rack devices, for example, servers, modems, storage systems, routers, and other equipment, such as power, cooling, and cable management resources, among others. Life cycle of the rack devices begins from the time devices are manufactured, assembled in the rack, and shipped to customer premises. Once the rack reaches the customer premises and gets into operational phase, various management aspects of the rack, for example, fault, configuration, authentication, performance, and secure management of the rack starts through a management station, for example an asset management station and a data center management station. From the secure management aspect, it is important to maintain an integrity of the rack both during the transit phase and operational phase of the rack to avoid issues, such as legal, data security, and device security which may arise due to loss of any rack devices. Further, adding a new rack device in an arbitrary available location in the rack, without appropriate analysis of availability of power and cooling in the rack, existing configuration of the rack space, and the like may lead to destabilization of workload, or introduce new security risk to the rack, and the data center hosting such rack. Further, when audit trials do not match with what is being monitored and managed by the asset management station and the data center management station, it may be a laborious task to track such anomalies in the data center.

Examples disclosed herein address the aforementioned problems, by using a controller disposed within the rack. More particularly, the technical solution may leverage the controller to determine any variations to an authorized configuration (base configuration or rack profile) of the rack during a transit and an operational phases of the rack, and generate alert signals to indicate the variations to the base configuration of the rack. Thus, one of the technical solution presented in the present disclosure may help to maintain integrity of the rack both during the transit and operational phases of the rack.

Further, the technical solution to the aforementioned problem may leverage the controller to communicate the alert signals to the management station, thus allowing authorized users of the rack to take corrective actions in the rack and update the rack profile based on such corrective actions. Thus, another technical solution presented in the present disclosure may enable the asset management station and the data center management station to operate in sync, thereby maintaining consistency in audit trails about what is being monitored and managed by the management station.

In one example embodiment, the controller may be a physical device having machine readable medium storing program instructions and a processing resource operably coupled to the machine readable medium. In such example embodiments, the controller used for secure management of a rack may execute program instructions to generate a first unique identifier corresponding to a rack profile (i.e., base configuration) of the rack hosting a plurality of rack devices including physical devices and logical devices, in accordance with a rack topology. The rack profile is based on configuration of the physical devices, the logical devices, and the rack topology. In one or more embodiments, the configuration is an authorized base configuration of the rack. Further, the controller may execute program instructions to receive information corresponding to the rack profile of the rack from a plurality of peripheral devices disposed in the rack. The information is based on monitored condition of the physical devices, the logical devices, and the rack topology. The controller may further execute the program instructions to generate a second unique identifier based on the information corresponding to the rack profile, and determine any variation in the rack profile based on comparison of the first and second unique identifiers. Further, the controller may execute the program instructions to generate an alert signal in the rack, in response to determination of the variation in the rack profile.

FIG. 1 illustrates a block diagram of a rack 102 having a controller 100 disposed within the rack 102. In one or more embodiments, the rack 102 may include a frame 104 to provide standardized structure for mounting a plurality of rack devices 106 to the rack 102. In one example embodiment, the rack 102 may have forty-two rack units (Uspace) along the height of the rack 102 for mounting the plurality of rack devices 106 to the frame 104. The rack 102 may further include a base 108 to host communication ports for a management station 110, the controller 100, and a light emitting diode (LED) 112. It should be noted herein that the term "controller" may refer to a physical hardware component having processor and memory, which is deployed within the rack 102, for example, and configured to execute program instructions to perform a plurality of tasks related to secure management of the rack 102. Similarly, the term "management station" refers to asset and/or data center management units, which are deployed outside the rack 102 and configured for management of hardware inventory and/or services offered using rack components/devices disposed within the rack 102.

The plurality of rack devices 106 may include, but not limiting to, a first server 106A, a router 106B, a storage unit 106C, a second server 106D, a third server 106E, a fourth server 106F, a network switch unit 106G, and an intelligent power distribution unit 106H (iPDU,) and other rack equipment's, such as power, cooling, and network cable management resources. It should be noted herein that other rack equipment's are not shown in FIG. 1, for ease of illustration and such illustration should not be construed as a limitation of the present disclosure. Each of the plurality of rack devices 106 may have certain unit (U) height. For example, each of the servers 106A, 106D-F, the router 106B, the network switch unit 106G, and the iPDU 106H may have one rack unit height and the storage 106C may have three rack unit height. Each of the plurality of rack devices 106 may be debatably coupled to the rack unit (Uspace) of the rack 102. Further, the plurality of rack devices 106 may be disposed adjacent to one another or disposed spaced apart from one another along the height of the rack 102. In certain embodiments, the rack 102 may host the plurality of rack devices 106 in accordance with a rack topology.

In one or more embodiments, each of the plurality of rack devices 106 may include physical devices and logical devices (not shown in FIG. 1) located within the respective rack device 106, as per the rack topology. In some example embodiments, the physical devices may include, but not limited to, a central processing unit (CPU), a dual inline memory module (DIMM), a hard disk drive (HDD), a network interface card (NIC), and the like. The logical devices may include, but not limited to, a device serial number, a device identification (ID), a device signature, a firmware version, and the like. The logical devices may additionally include a flag to count number of times a rack door (not shown) is opened. The rack topology may include a hardware topology, a power topology, and a network topology. The hardware topology may include, but not limited to, number of rack units, type of rack devices, for example, servers, iPDU, storage units, network switch units, and the like, and the rack units that are occupied by the plurality of rack devices 106 or empty rack units. The power topology may include details about power cables that are connected between the iPDU 106H and each of the plurality of rack devices 106. Similarly, the network topology may include details about network cables that are connected between the network switch unit 106G and each of the plurality of rack devices 106.

In some example embodiments, each of the plurality of rack devices 106 may include at least one data port 114, for example, a universal serial bus (USB) port at the Uspace of the rack 102. Further, an empty Uspace may also include the data port 114. In such example embodiments, the data port 114 may receive one peripheral device of a plurality of peripheral devices 116. The peripheral device 116 may contain information for the corresponding rack device 106 mounted in the Uspace of the rack 102. In some embodiments, the plurality of peripheral devices 116 may query the rack device 106 and obtain the information corresponding to the rack device 106. The information may relate to configuration details of each of the rack devices 106 including physical devices, logical devices, and rack topology. In some example embodiments, the information may include, but is not limited to, the device identification (ID), the device serial number, the device signature, the firmware version, type of the rack device (e.g., server, storage, iPDU, network switch, and the like), the rack unit occupied by each rack device, the rack unit ID occupied by the rack device, and the like. It should be noted herein that, the plurality of peripheral devices 116 may function as sensors to monitor the configuration of each of the plurality of rack devices 106 mounted in the Uspace of the rack 102. In some embodiments, some of the rack devices, for example, the iPDU 106H and the network switch unit 106G may additionally function as the peripheral devices 116 to monitor the power and network bandwidth usage respectively from the each of the plurality of rack devices 106 mounted in the Uspace of the rack 102.

In some example embodiment, the plurality of rack devices 106 is first assembled in the rack 102 as per a base configuration (or rack profile) of the rack 102. The rack profile may be generated based on the customer requirement. More particularly, the rack profile may be generated based on configuration of the plurality of rack devices 106 and the rack topology. In some embodiments, a management station 110 may authorize the rack profile, once the plurality of rack devices 106 is assembled in the rack 102.

In one or more embodiments, the controller 100 includes a processing resource, for example, a central processing unit (CPU,) a graphics processing unit (GPU,) a microprocessor, or other hardware devices suitable for performing the functionality described in relation to FIGS. 1-7. The controller 100 may additionally include a processing resource and a machine readable medium storing program instructions, operably coupled to the processing resource. In one or more embodiments, the controller 100 is communicatively coupled to the plurality of peripheral devices 106, the LED 112, and the management station 110.

Once the management station authorizes the rack profile of the rack 102, the controller 100 may generate individual unique identifier for each of the plurality of rack devices 106 occupying the Uspace of the rack 102, the empty Uspace of the rack 102, and the rack topology. In certain embodiments, the individual unique identifier for each of the plurality of rack devices 106 may be stored in a memory (part of the machine readable medium) of the controller 100. For example, the memory may be erasable programmable read only memory (EPROM). In some embodiments, the individual unique identifier may have an alpha-numeric character such as a hash number, for example. The individual unique identifier may be generated using algorithms, such as apache, commons, google guava, and the like.

In the illustrated embodiment of FIG. 1, the controller 100 may generate an individual unique identifier 120A for the first server 106A, an individual unique identifier 120B for a first empty Uspace 107A located above the first server 106A, an individual unique identifier 120C for the router 106B, an individual unique identifier 120D for a second empty Uspace 107B located above the router 106B, an individual unique identifier 120E for the storage unit 106C, an individual unique identifier 120F for a third empty Uspace 107C located above the storage unit 106C, an individual unique identifier 120G for a group of servers, for example, the second, third, and fourth servers, 106D-F, an individual unique identifier 120H for the fourth empty Uspace 107D located above the group of servers 106D-F, an individual unique identifier 120I for the network switch unit 106G, an individual unique identifier 120J for a fifth empty Uspace 107E located above the network switch unit 106G, an individual unique identifier 120K for the iPDU 106H, and an individual unique identifier 120L for a sixth empty Uspace 107F located above the iPDU 106H. Further, the controller 100 may aggregate each of the individual unique identifiers 120A-120L to generate a first unique identifier 122 corresponding to the rack profile of the rack 102 hosting the plurality of rack devices 106 including physical devices and logical devices, in accordance with the rack topology. In certain embodiments, the first unique identifier may be stored in the memory of the controller 100, as discussed herein.

Figure 2:
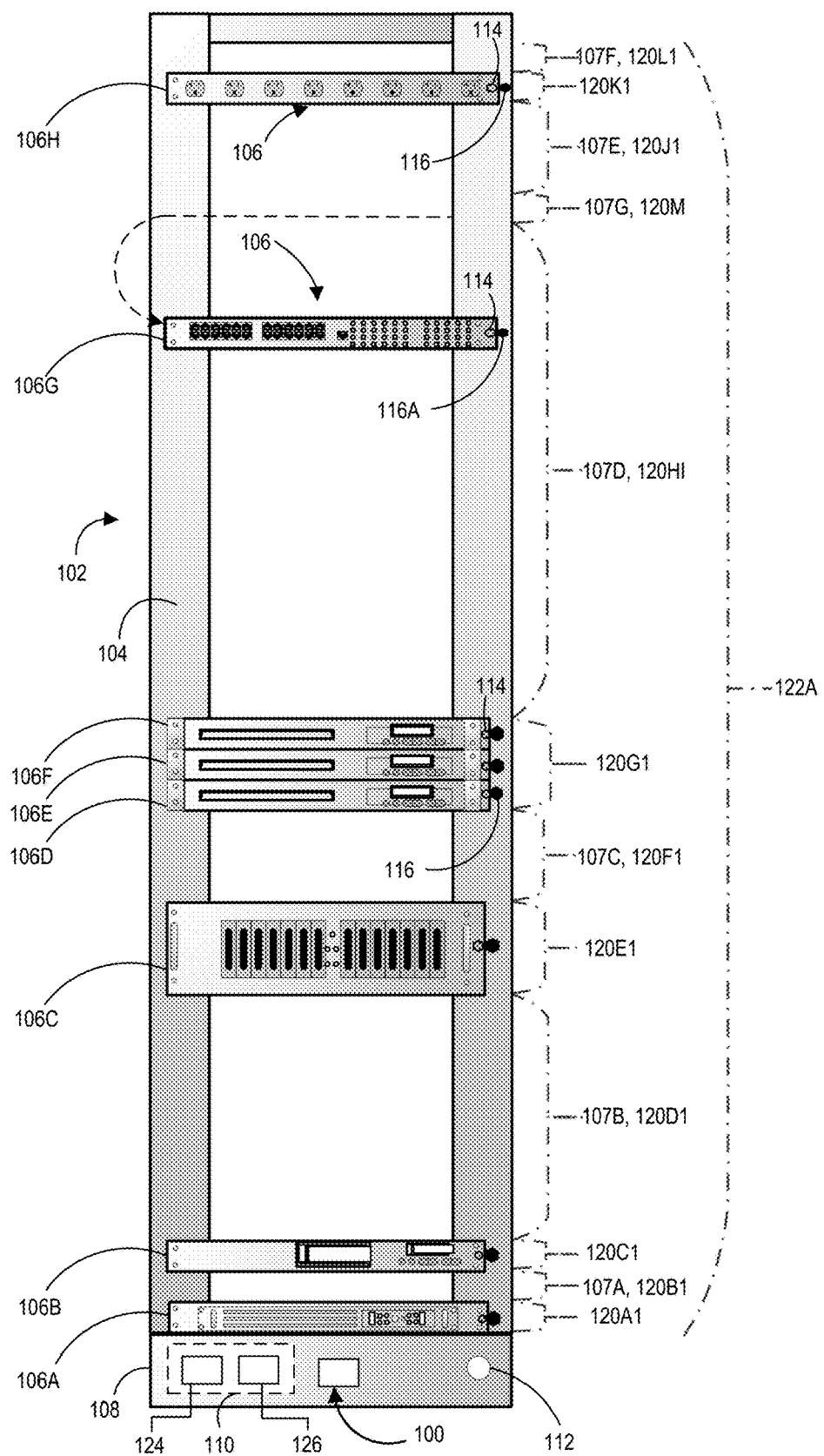
FIG. 2 is a block diagram depicting the controller for secure management of the rack, in accordance with embodiment of FIG. 1.

FIG. 2 illustrates a block diagram of the rack 102 having the controller 100 disposed within the rack 102 for secure management of the rack 102 in accordance with embodiments of FIG. 1. In some example embodiments, the controller 100 may receive information corresponding to the rack profile of the rack 102 from a plurality of peripheral devices 116 disposed in the rack 102. The information may be based on monitored condition of each of the plurality of rack devices 106 including the physical devices, the logical devices, and the rack topology. The controller 100 may obtain the information both during transit phase and operational phase of the rack 102. Further, the controller 100 may obtain such information during at least one of an event, a scheduled interval, or a random interval.

It should be noted herein that the term "event" means an activity happened in the rack 102. Similarly, the term "scheduled interval" means a periodic recess, for example, once in every 30 minutes, and the term "random interval" means an authorized user initiated recess, for example, during maintenance of the rack 102. In one non-limiting example, the event may correspond to opening of a door (not shown) of the rack 102, or variation in temperature or power consumption or network bandwidth usage in at least one rack device of the plurality of rack devices 106. In such non-limiting example embodiments, the rack 102 may include peripheral devices, such as motion sensors, or temperature sensors (not shown) to detect the opening of door event or variation in temperature event respectively. Further, the controller 100 may receive information related to the power consumption and network bandwidth usage from the iPDU 106H and the network switch unit 106G respectively. In some other example embodiments, the controller 100 may obtain the information by polling data from each of the plurality of peripheral devices 116 at scheduled intervals, for example, once in ten minutes. In such example embodiments, each peripheral device 116 may query the plurality of rack devices 106 to obtain information of the rack 102, which is indicative of an instantaneous rack profile or rack condition or rack configuration. In some other example embodiments, the controller 100 may obtain the information by polling data from each of the plurality of peripheral devices 116 at random intervals, for example, during maintenance of the rack 102. Even in such example embodiments, each peripheral device 116 may query the plurality of rack devices 106 to obtain information of the rack 102, which is representative of the instantaneous rack profile or the rack condition or rack configuration.

In the illustrated embodiment of FIG. 2, the network switch unit 106G is shifted to the fourth empty Uspace 107D. In such example embodiment, the controller 100 may obtain the information by polling the data from the plurality of peripheral devices 116 including a peripheral device 106A of the network switch unit 106G.

The controller 100 may generate a second unique identifier 122A based on the information corresponding to monitored condition of the rack 102 (which is representative of the instantaneous rack profile or rack condition or rack configuration) by the plurality of peripheral devices 116. In one or more embodiments, the controller 100 may first regenerate an individual unique identifier for each of the plurality of rack devices 106 occupying the Uspace of the rack 102, the empty Uspace of the rack 102, and the rack topology by using the information received from the plurality of peripheral devices 116. For example, the controller 100 may regenerate an individual unique identifier 120A1 for the first server 106A, an individual unique identifier 120B1 for the first empty Uspace 107A, an individual unique identifier 120C1 for the router 106B, an individual unique identifier 120D1 for the second empty Uspace 107B, an individual unique identifier 120E1 for the storage unit 106C, an individual unique identifier 120F1 for the third empty Uspace 107C, an individual unique identifier 120G1 for the group of servers, for example, the second, third, and fourth servers, 106D-F, an individual unique identifier 120HI for the fourth empty Uspace 107D having the network switch unit 106G, an individual unique identifier 120M for a new empty Uspace 107G located above the fourth Uspace 107D, an individual unique identifier 120J1 for the fifth empty Uspace 107E, an individual unique identifier 120K1 for the iPDU 106H, and an individual unique identifier 120L1 for the sixth empty Uspace 107F. Further, the controller 100 may aggregate each of the individual unique identifiers 120A1-120G1, 120HI, 120J1-120L1, and 120M to generate the second unique identifier 122A corresponding to an instantaneous rack profile or condition or configuration of the rack 102, monitored by the plurality of the peripheral devices 116.

The controller 100 may further determine variation in the rack profile based on comparison of the first unique identifier 122 and the second unique identifier 122A. In the illustrated embodiment, the first and second unique identifiers 122, 122A are different because of variation in the individual unique identifiers 120H and 120I (referring to FIG. 1) and the new unique identifier 120M. It should be noted herein that the individual unique identifier 120HI is generated for the fourth empty Uspace 107D due to the relocation of the network switch unit 106G in the empty Uspace 107D. Similarly, the new individual unique identifier 120M is generated for the new empty Uspace 107G due to relocation of the network switch unit 106G to the fourth empty Uspace 107D.

Accordingly, the controller 100 may generate the alert signal in the rack, in response to determination of the variation in the rack profile. In the example embodiment of FIG. 2, the controller 100 may emit light through the LED 112, as the alert signal to the users of the rack 102. Further, in some other embodiments, when the rack 102 is in the operational phase, the controller 100 may deny power supply to the rack 102, in response to determination of the variation in the rack profile.

In some other example embodiments, the controller 100 may further communicate the alert signal to the management station 110. For example, the controller 100 may correlate the base rack profile with the monitored information to identify the variation in a particular physical devices, logical devices, or rack topology. Upon determination of variation, the controller 100 may communicate the analyzed information to the management station 110.

In the illustrated embodiment, the controller 100 may compare the individual unique identifiers 120A-120L stored in the memory and the regenerated individual unique identifiers 120A1-120G1, 120HI, 120J1-120L1, and 120M to detect the variation in the rack device of the plurality of rack devices 106. The controller 100 may detect that the variation in the rack profile is due to the relocation of the network switch unit 106G into the fourth empty Uspace 107D of the rack 102. In other words, the controller 100 may detect the variation in rack topology, because of relocation of the network switch unit 106G into the fourth empty Uspace 107D. Accordingly, the controller 100 may communicate the analyzed data to the management station 110.

The management station 110 may further notify users of the rack 102 to take corrective actions, such as performing modifications to the rack topology, and update the rack profile based on such corrective actions. In such example embodiments, the management station 110 may later authorize the updated rack profile and communicate the authorized rack profile to the controller 100. The controller 100 upon receiving notification from the management station 110 may regenerate the individual unique identifiers for each of the plurality of rack devices, empty Uspace, and the rack topology and update the memory with the new individual unique identifiers. Further, the controller 100 may regenerate the first unique identifier 122 by aggregating the regenerated individual unique identifiers stored in the memory, and update the regenerated first unique identifier in the memory. The controller 100 may later use the updated first unique identifier 122 (as the identifier for the base configuration of the rack 102) for comparing with the second unique identifier 122A. Accordingly, the controller 100 may provide a secure management of the rack 102 during the operational phase of the rack 102.

In some examples, during operational phase of the rack 102, users may voluntarily update the rack profile based on the request from the customer. For example, the users of a data center management station 124 may plan to remove one device/component of the rack 102, for example, the first server 106A from the rack 102 based on the customer requirement, and accordingly update the rack profile. The data center management station 124 may notify the controller 100 about the updated rack profile. Accordingly, the controller 100 may regenerate individual unique identifiers for each rack device/component occupying the Uspace of the rack, the empty Uspace of the rack, and the rack topology, and aggregate the individual unique identifiers to regenerate the first unique identifier 122. However, the users may have forgotten to physically remove the first server 106A from the rack 102. Thus, when the controller 100 regenerates the second unique identifier 122A after some scheduled interval, it determines variation in the rack profile based on the comparison of the first and second unique identifiers, and generates alerts to the management station 110 about the variation in the rack profile. In such example embodiment, the users of the asset management station 126, may take corrective actions by physically removing the first server 106A from the rack 102. Thus, the controller 100 as discussed herein may enable the asset management station 126 and the data center management station 124 to operate in sync, thereby maintaining consistency in audit trails about what is being monitored and managed by the management station 110.

In some examples, during operational phase of the rack, the user may remove one of the rack device, for example, the first server 106A from a rack unit of the rack 102. The user may add one central processing unit (CPU) to the first server 106A and reinsert the first server 106A in the same rack unit of the rack 102, without updating the rack profile. As discussed herein, the controller 100 may generate second unique identifier, compare the first and second unique identifiers, and generate the alert signal based on the determined variation in the rack profile. The controller 100 may further analyze the individual unique identifiers by correlating the power consumption and the network bandwidth usage data in the rack profile corresponding to the first server 106A with the power consumption and the network bandwidth usage information obtained from the peripheral device 116 to identify the variation in the physical device of the first server 106A.

In some other examples, during transit phase of the rack 102, the user may have inadvertently opened the rack door and then closed the rack door without making any changes/modification to the rack profile. Else, the rack door may have opened accidently due to impact or jerk, for example of the rack 102 during transit. In such examples, the controller 100 may poll the information from the plurality of peripheral devices 116 to determine variation in the rack profile. Since, the rack door opening is included as counter in the logical device of the rack device 106 for generating the first unique identifier, the unauthorized opening of the door may result in pooling information from the plurality of peripheral devices 116. Accordingly, the controller 100 may generate the second unique identifier, which may be different than that of the first unique identifier. Thus, the controller 100 may generate the alert signals in the rack 102 for the end user to physically inspect the rack 102 before putting the rack in operational phase. In such example embodiments, the end user may update the rack profile by incrementing the counter related to the door opening and get the first unique identifier regenerated by the controller, before putting the rack 102 in the operational phase. Accordingly, the controller 100 may provide a secure management of the rack 102 during the transit phase.

In some other examples, during maintenance phase of the rack 102, the user may voluntarily update the rack profile, for example, by incrementing the counter related to door opening. After the inspection of the rack 102, the user may have closed the door of the rack 102 without making any modifications to the rack device 106 or the rack topology. In such examples, the controller 100 may poll the information from the plurality of peripheral devices 116, at some scheduled interval, to determine variation in the rack profile. Since, the door opening is considered in the updated rack profile, and used for regenerating the first unique identifier, the opening of the door may not result as variation in the rack profile. Thus, the controller 100 may not generate alert signals and may continue permitting the power supply to the rack 102, in response to determination of the non-variation in the rack profile. Accordingly, the controller 100 may provide a secure management of the rack 102 during the operational phase of the rack 102.

In some other examples, either during operational phase or transit phase of the rack 102, the users may change the network and/or power topology of the rack 102 by changing network and/or power cables respectively. In such examples, the controller 100 may determine variation in the network and/or power cables topology, by generating second unique identifier 122A, comparing the first and second unique identifiers 122, 122B, and generating the alert signal in the rack 102, in case of determination of variation in the network and/or power cables topology. Accordingly, the controller 100 may provide a secure management of the rack 102 during the operational phase or transit phase of the rack 102.

Figure 3:
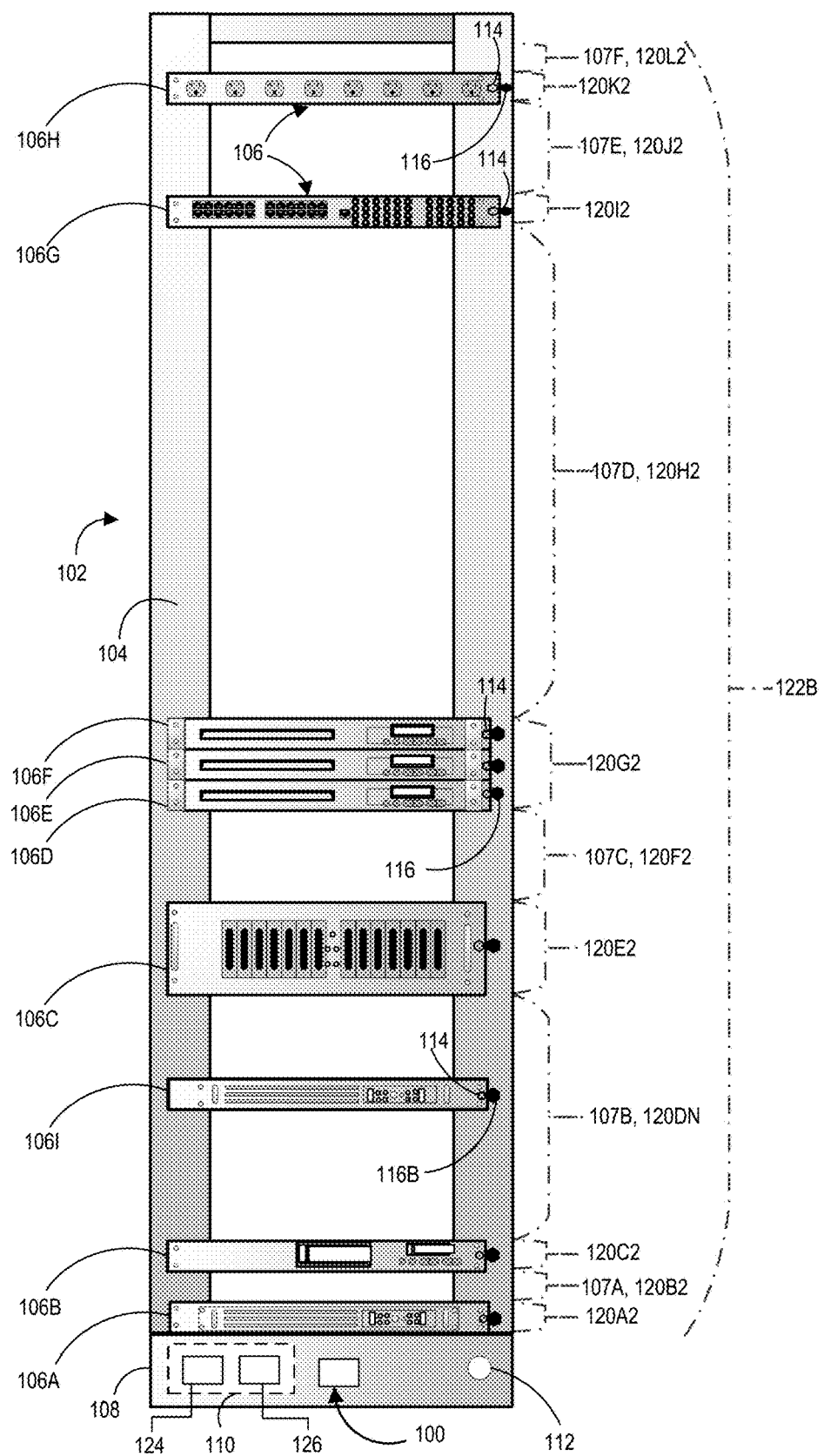
FIG. 3 is a block diagram depicting the controller for secure management of the rack, in accordance with embodiment of FIG. 1.

FIG. 3 illustrates a block diagram of the rack 102 having the controller 100 disposed within the rack 102 for secure management of the rack 102 in accordance with embodiments of FIG. 1. In the illustrated embodiment of FIG. 3, a new rack device, for example a fifth server 106I is added in the second empty Uspace 107B located above the router 106B. In such example embodiment, the controller 100 may obtain the information of the rack 102 by polling the data from the plurality of peripheral devices 116. It should be noted herein that the controller 100 may also poll the data from a peripheral device 116B connected to the fifth server 106I. The controller 100 may later generate a second unique identifier 122B based on the information corresponding to condition of the rack 102 (which is representative of the instantaneous rack or condition or configuration) monitored by the plurality of peripheral devices 116. In particular, the controller 100 may first regenerate an individual unique identifier for each of the plurality of rack devices 106 occupying the Uspace of the rack 102, the empty Uspace of the rack 102, and the rack topology by using the information received from the plurality of rack devices 116. For example, the controller 100 may regenerate an individual unique identifier 120A2 for the first server 106A, an individual unique identifier 120B2 for the first empty Uspace 107A, an individual unique identifier 120C2 for the router 106B, an individual unique identifier 120DN for the second empty Uspace 107B having the fifth server 106I, an individual unique identifier 120E2 for the storage unit 106C, an individual unique identifier 120F2 for the third empty Uspace 107C, an individual unique identifier 120G2 for the group of servers, for example, the second, third, and fourth servers, 106D-F, an individual unique identifier 120H2 for the fourth empty Uspace 107D, an individual unique identifier 120I2 for the network switch unit 106G, an individual unique identifier 120J2 for the fifth empty Uspace 107E, an individual unique identifier 120K2 for the iPDU 106H, and an individual unique identifier 120L2 for the sixth empty Uspace 107F. Further, the controller 100 may aggregate all of the individual unique identifiers 120A2-120C2, 120DN, and 120E2-120L2 to generate the second unique identifier 122B corresponding to an instantaneous rack profile or condition or configuration of the rack 102, monitored by the plurality of the peripheral devices 116.

The controller 100 may further determine variation in the rack profile based on comparison of the first unique identifier 122 and the second unique identifier 122B. In the illustrated embodiment, the first and second unique identifiers 122, 122B are different because of variation in the individual unique identifiers 120D (referring to FIG. 1). It should be noted herein that the individual unique identifier 120DN is generated for the second empty Uspace 107B due to the addition of the fifth server 106I in the second empty Uspace 1076.

Accordingly, the controller 100 may generate alert signal in the rack, in response to determination of the variation in the rack profile. In the example embodiment of FIG. 3, the controller 100 may emit light through the LED 112, as the alert signal to the users of the rack 102. Further, in some other embodiments, when the rack 102 is in operational phase, the controller 100 may deny power supply to the rack 102, in response to determination of the variation in the rack profile. In some other example embodiments, the controller 100 may further communicate the alert signals to the management station 110. In the illustrated embodiment, the controller 100 may compare the individual unique identifiers 120A-120L stored in the memory and the regenerated individual unique identifiers 120A2-120C2, 120DN, and 120E2-120L2 to detect the variation in the rack device of the plurality of rack devices 106.

The controller 100 may detect that the variation in the rack profile is due to the addition of the fifth server 106I in the second empty Uspace 1076 of the rack 102. In other words, the controller 100 may detect the variation in rack device, because of addition of the fifth server 106I into the second empty Uspace 107B. Accordingly, the controller 100 may communicate the analyzed data to the management station 110. In such examples, the management station 110 may further notify users of the rack 102 to take corrective actions, such as restoring the original configuration of the rack devices 116 by removing the fifth server 106I or authorizing the addition of the fifth server 106I, and update the rack profile based on such corrective actions. In such example embodiments, the management station 110 may further authorize the updated rack profile and communicate the authorized rack profile to the controller 100. The controller 100 upon receiving notification from the management station 110 may regenerate the individual unique identifiers for each of the plurality of rack devices, empty Uspace, and the rack topology and update the memory with the new individual unique identifiers. Further, the controller 100 may regenerate the first unique identifier 122 by aggregating the regenerated individual unique identifiers stored in the memory, and update the regenerated first unique identifier in the memory. The controller 100 may later use the updated first unique identifier 122 (as the identifier for the base configuration of the rack 102) for comparing with the second unique identifier 122B. Accordingly, the controller 100 may provide a secure management of the rack 102 during the operational phase of the rack 102.

Figure 4:
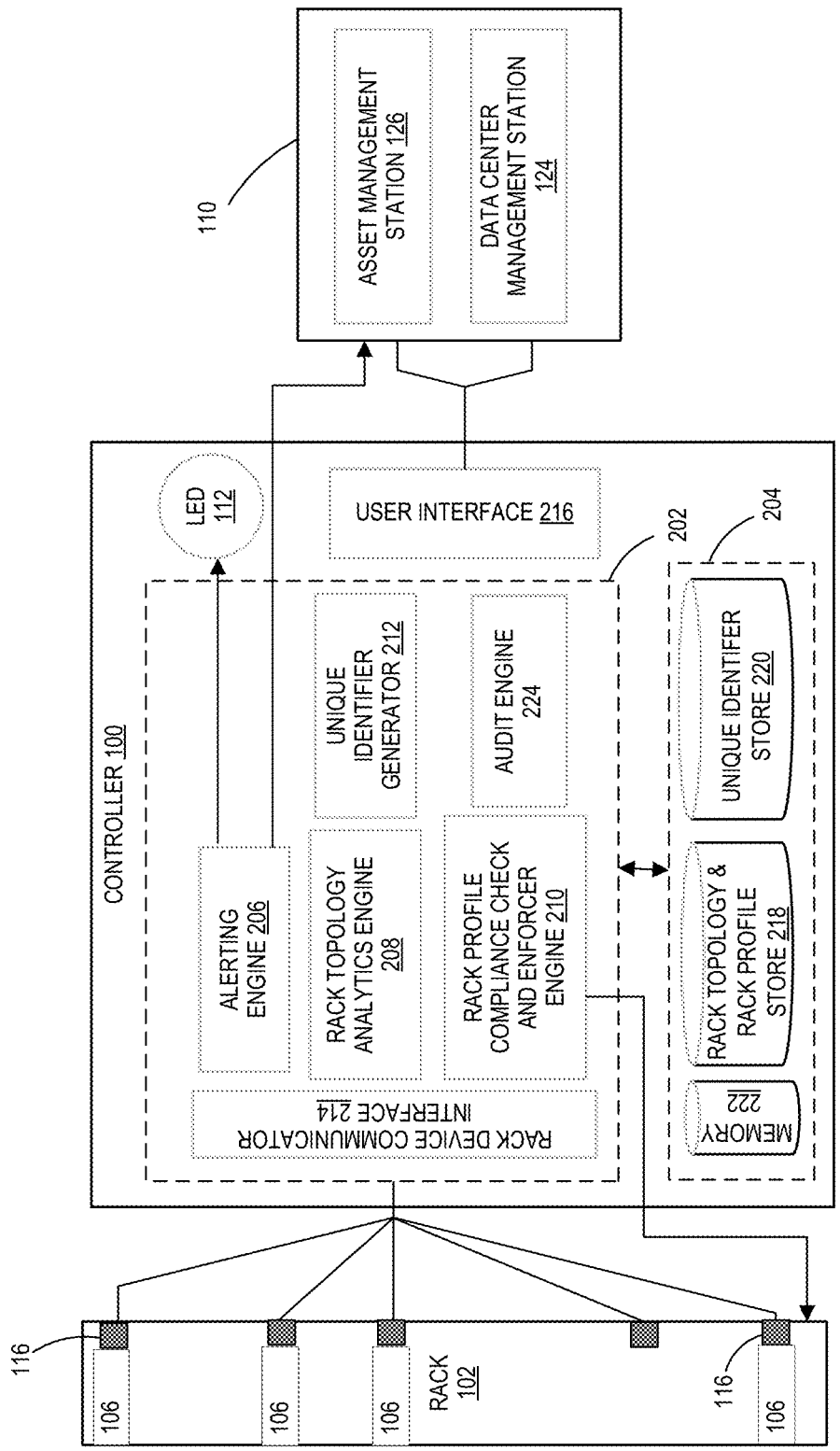
FIG. 4 is a block diagram depicting a controller communicatively coupled to a plurality of peripheral devices disposed in a rack and a management station, in accordance with embodiments of the present disclosure.

FIG. 4 illustrates a block diagram of a controller 100 communicatively coupled to a plurality of peripheral devices 116 disposed in a rack 102 and a management station 110. As discussed in the embodiment of FIGS. 1-3, the rack 102 includes a plurality of rack devices 106 and a plurality of peripheral devices 116 coupled to the rack devices 106. In the illustrated embodiment of FIG. 4, the controller 100 includes a processing resource 202 and a machine readable medium (memory) 204 operably coupled to the processing resource 202. The processing resource 202 may execute program instructions corresponding to a plurality of engines, for example, an alerting engine 206, a rack topology analytics engine 208, a rack profile check and enforcer engine 210, a unique identifier generator 212, a rack device communicator interface 214, and an audit engine 224. It should be noted herein that the term "engine" may refer to both hardware component and also the software/firmware instructions. The machine readable medium 204 includes a rack topology and rack profile store 218, a unique identifier store 220, and a memory 222. The controller 100 may additionally include a user interface 216 for providing interface for the management station 110, and a LED 112 for emitting light in response to an alert signal from the controller 100. The management station 110 includes a data center management station 124 and an asset management station 126.

The controller 100 may access the memory 222 having program instructions stored therein, to implement the functions of the plurality of engines. In particular, the controller 100 may interact with the plurality of peripheral devices 116 through the rack device communicator interface 214. In some example embodiment, the processing resource 202 may store a base configuration (rack profile) of the rack 102 in the rack topology and rack profile store 218. The base configuration of the rack profile may have been authorized by the management station 110. In such examples, the unique identifier generator 212 may later generate individual unique identifiers for the rack 102 based on the rack profile and rack topology data received from the store 218, and store the individual unique identifier in the unique identifier store 220, as discussed in the embodiment of FIGS. 1-3. Further, the unique identifier generator 212 may generate the first unique identifier for the rack 102 by aggregating the individual unique identifier stored in the store 220, as discussed in the embodiment of FIGS. 1-3. In such examples, the processing resource 202 may store the first unique identifier in the unique identifier store 220.

Further, the rack profile compliance check and enforcer engine 210 may receive monitored information (or condition) of the rack from the plurality of peripheral devices 116, communicates the information to the unique identifier generator 212 to generate the second unique identifier. The enforcer engine 210 may receive the second unique identifier from the generator 212. The enforcer engine 210 may compare the first and second unique identifiers to determine any variation in the rack profile of the rack 102. In case of determination of any variation in the rack profile, the enforcer engine 210 may deny power supply to the rack 102. Further, the alerting engine 206 may generate the alert signals in case of determination of variation in the rack profile and accordingly emit light in the LED 112. In some examples, the alerting engine 206 may further communicate the alert signals to the management station 110. In some examples, the users of the asset management station 126 and the data center management station 124 may interact with the controller 100 via the user interface 216 for i) requesting, at random interval, for the information (about the monitored rack condition) from the plurality of peripheral devices 116 and/or updating the rack profile and storing the updated rack profile in the store 218 via the interface 216.

The rack topology and analytics engine 208 may perform the function of analyzing the individual unique identifiers to determine the variation in the rack 102. In particular, the engine 208 may correlate the rack profile data with the monitored information to identify variation in at least one of the physical devices, the logical devices, or the rack topology. In some embodiments, engine 208 may obtain the individual unique identifiers from the store 220 and compare the individual unique identifiers with the regenerated individual unique identifiers to identify the variation in the rack device. The audit engine 224 may maintain trails of any or all authorized or unauthorized changes to the rack profile.

Figure 5:
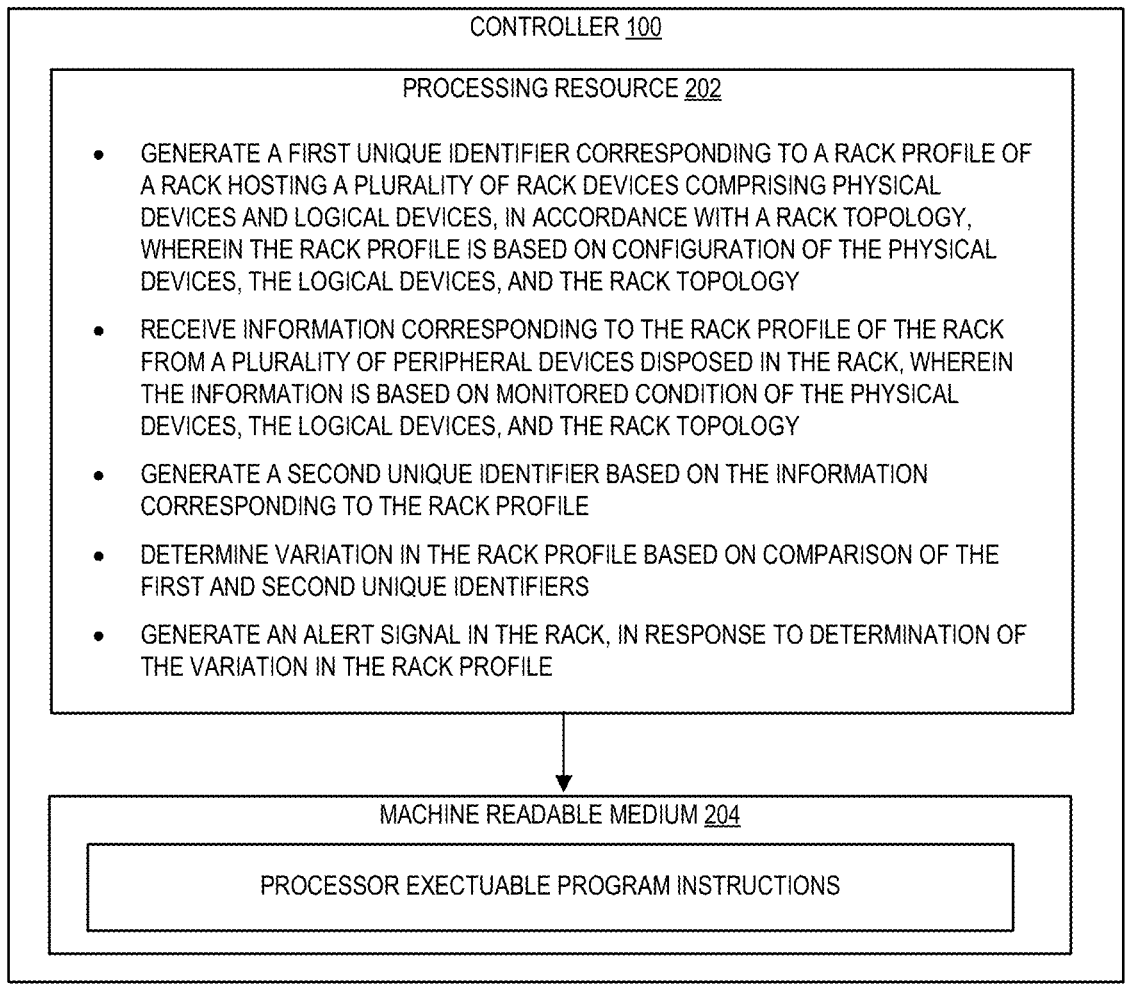
FIG. 5 is a block diagram depicting a controller having a processing resource operably coupled to a machine readable medium storing executable program instructions, in accordance with embodiments of the present disclosure.

FIG. 5 illustrates a block diagram of the controller 100 having a processing resource 202 and a machine readable medium 204 storing executable program instructions. In the example embodiment, the processing resource 202 is operably coupled to the machine readable medium 204. The processing resource 202 may be a physical processor. In some examples, the physical processor may be at least one of a central processing unit (CPU), a graphics processing unit (GPU), a microprocessor, and/or other hardware devices suitable for performing the functionality described in relation to FIGS. 1-3. In some examples, the machine readable medium 204 is non-transitory and is alternatively referred to as a non-transitory machine readable medium 204.

The processing resource 202 executes one or more program instructions to perform one or more functions described in FIGS. 1-3. For example, the processing resource 202 may execute program instructions to generate a first unique identifier corresponding to a rack profile of a rack 102 hosting a plurality of rack devices 116 including physical devices, logical devices, in accordance with the rack topology. The rack profile may be based on base configuration of the physical devices, the logical devices, and the rack topology. The details of generating the first unique identifier is described in conjunction with FIGS. 1-3.

The processing resource 202 may further execute program instructions to receive information corresponding to the rack profile of the rack 102 from a plurality of peripheral devices 116 disposed in the rack 102. The information may be based on monitored condition of the physical devices, the logical devices, and the rack topology. The details of receiving the information corresponding to the rack profile of the rack 102 from the plurality of peripheral devices 116 is described in conjunction with FIGS. 1-3.

The processing resource 202 may further execute program instructions to generate a second unique identifier based on the information corresponding to the rack profile and determine variation in the rack profile based on the comparison of the first and second unique identifiers. The details of generating the second unique identifier and comparing the first and second unique identifiers to determine the variation in the rack profile are described in conjunction with FIGS. 1-3.

Further, the processing resource 202 may execute the program instructions to generate an alert signal in the rack 102, in response to determination of the variations in the rack profile. The details of generating the alert signals is described in conjunction with FIGS. 1-3.

Figure 6:
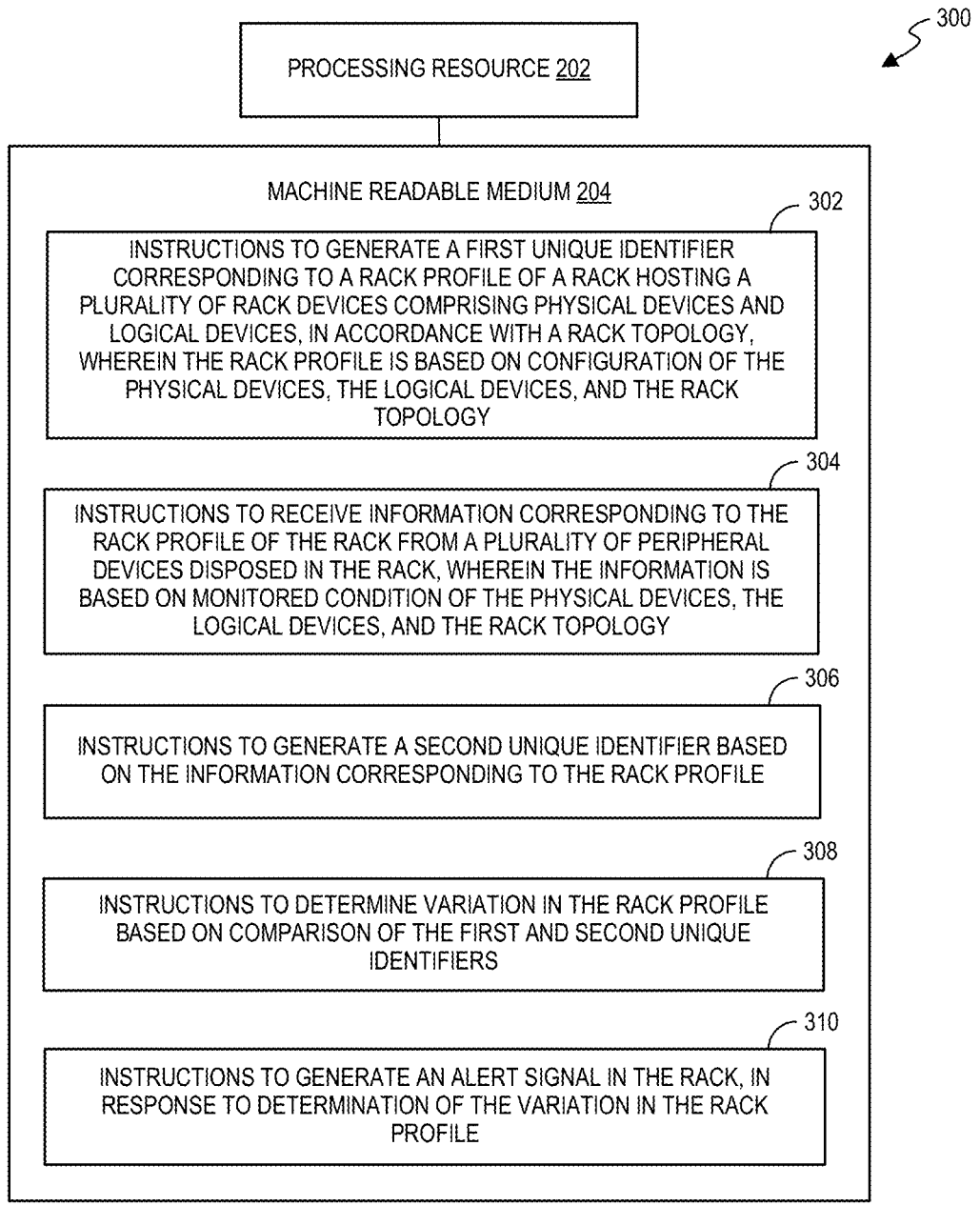
FIG. 6 is a block diagram depicting a processing resource and a machine readable medium encoded with example instructions for secure management of a rack through a controller, in accordance with embodiments of the present disclosure.

FIG. 6 illustrates a block diagram depicting a processing resource 202 and a machine readable medium 204 encoded with example instructions for secure management of a rack 102 through a controller 100. It should be noted herein that the processing resource 202 and the machine readable medium 204 discussed in the embodiments of FIGS. 5-6 are similar components.

The machine readable medium 204 may be accessed by the processing resource 202. In particular, the alerting engine 206, the rack topology analytics engine 208, the rack profile check and enforcer engine 210, the unique identifier generator 212, the rack device communicator interface 214, and the audit engine 224 as described in FIG. 4 may be implemented using the processing resource 202 and the machine readable medium 204.

The machine readable medium 204 may be encoded with example instructions 302, 304, 306, 308, 310. The instruction 302, when executed by the processing resource 202, may implement aspects of generating a first unique identifier corresponding to a rack profile of the rack 102 hosting a plurality of rack devices 116, including physical devices, logical devices, in accordance with the rack topology, for example. The rack profile may be based on base configuration of the physical devices, the logical devices, and the rack topology. The instruction 304, when executed, may cause the processing resource 202 to receive information corresponding to the rack profile of the rack 102 from a plurality of peripheral devices 116 disposed in the rack 102. The information may be based on monitored condition of the physical device, the logical devices, and the rack topology. The instruction 306, when executed, may cause the processing resource 202 to generate a second unique identifier based on the information corresponding to the rack profile. Further, the instructions 308, when executed, may cause the processing resource 202 to determine variation in the rack profile based on comparison of the first and second unique identifiers. The instructions 310, when executed, may cause the processing resource 202 to generate an alert signal in the rack 102, in response to determination of the variation in the rack profile.

FIG. 7 illustrates a flow diagram of an example method 400 for secure management of a rack 102. The method 400 starts at a block 402 and continues to a block 404. At block 404, the method 400 includes generating a first unique identifier corresponding to a rack profile of a rack 102 hosting a plurality of rack devices 106 including physical devices, logical devices, in accordance a rack topology. The rack profile is based on configuration of the physical devices, the logical devices, and the rack topology. In the presently contemplated example, a processing resource 202 performs the function of generating the first unique identifier based on the base configuration of the rack 102, at the block 404.

The method 400 further continues to a block 406. At block 406, the method 400 includes receiving information corresponding to the rack profile of the rack 102 from a plurality of peripheral devices 116 disposed in the rack 102. The information may be based on monitored condition of the physical devices, the logical devices, and the rack topology. In the presently contemplated example, the processing resource 202 performs the function of receiving the information from the plurality of peripheral devices 116, at the block 406.

Further, the method 400 continues to a block 408. At block 408, the method 400 includes generating a second unique identifier based on the information corresponding to the rack profile. In the presently contemplated example, the processing resource 202 performs the function of generating the second unique identifier, at the block 408.

The method 400 further continues to a block 410. At block 410, the method 400 includes determining variation in the rack profile based on comparison of the first and second unique identifiers. In the presently contemplated example, the processing resource 202 performs the function of determining the variation in the unique identifiers, at the block 410. Further, in response to determination of variation in the first and second unique identifiers, the method 400 includes generating alert signals in the rack to indicate the variation in the rack profile of the rack 102, at block 412. In the presently contemplated example, the processing resource 202 performs the function of generating the alert signals, at the block 412. In some other embodiments, the method 400 may further include a sub-block of communicating the alert signals to a management station 110 to perform some corrective measures. Additionally, the method 400 may include sub-block of denying power supply to the rack in response to determination of variation in the base configuration of the rack 102. Further, in response to determination of a non-variation in the first and second unique identifiers, the method 400 may include permitting the power supply or continuing the power supply to the rack 102. The method 400 ends at the block 414.

Various features as illustrated in the examples described herein may be implemented to secure management of rack. Specifically, the technical solution presented in the present disclosure may help to maintain integrity of the rack both during the transit and operational phases of the rack. Further, the invention enables asset management station and data center management station to operate in sync, thereby maintaining consistency in audit trails about what is being monitored and managed by the management station.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method of managing a plurality of rack devices, the method comprising:
   generating, by a unique identifier generator of a controller disposed within a rack hosting a plurality of rack devices comprising physical devices and logical devices, a first unique identifier comprising a first set of individual unique identifiers corresponding to a rack profile of the rack hosting the plurality of rack devices, wherein the rack profile is based on information identifying the plurality of rack devices and a rack topology comprising respective locations at which the plurality of rack devices is hosted within the rack;
   receiving, by a compliance check and enforcement engine of the controller, updated information identifying the plurality of rack devices and the rack topology from a plurality of peripheral devices disposed within the rack, wherein the updated information is obtained by the peripheral devices monitoring conditions of the plurality of rack devices and the rack topology;
   receiving, by the unique identifier generator of the controller, the updated information from the compliance check and enforcement engine;
   generating, by the unique identifier generator of the controller, a second unique identifier comprising a second set of individual unique identifiers based on the updated information;
   determining, by the compliance check and enforcement engine of the controller, a variation in the rack profile based on a comparison of the first and second sets of individual unique identifiers, wherein the variation corresponds to one or more of the following events:
      an opening of a door of the rack,
      a variation in temperature,
      power consumption, or network bandwidth usage in at least one rack device of the plurality of rack devices, or
      an addition or removal of at least one rack device of the plurality of rack devices; and
   generating, by an alert engine of the controller, an alert signal in the rack, in response to the determination of the variation in the rack profile.

2. The method of claim 1, wherein the generating the first unique identifier comprises:
   generating an individual unique identifier for each rack device occupying an Uspace of the rack, an empty Uspace of the rack, and the rack topology; and
   aggregating the individual unique identifier to generate the first unique identifier.

3. The method of claim 1, wherein receiving the updated information comprises obtaining the updated information in response to at least one of an event, a scheduled interval, or a random interval.

4. The method of claim 3, further comprising correlating, by the compliance check and enforcement engine of the controller, the rack profile with the updated information to identify whether the variation occurred in at least one of the physical devices, the logical devices, or the rack topology.

5. The method of claim 1, wherein determining the variation in the rack profile comprises detecting the variation in the rack profile during one or more of a transit phase of the rack or an operational phase of the rack.

6. The method of claim 1, further comprising denying, by the compliance check and enforcement engine of the controller, power supply to the rack, in response to the determination of the variation in the rack profile.

7. The method of claim 1, further comprising permitting, by the compliance check and enforcement engine of the controller, power supply to the rack, in response to a determination of a non-variation in the rack profile.

8. The method of claim 1, further comprising communicating the alert signal to a management station.

9. The method of claim 8, further comprising:
   authorizing, by the management station, an updated rack profile based on user input corresponding to modifications to at least one of the physical device, the logical device, or the rack topology; and
   generating, by the unique identifier generator of the controller, a third unique identifier based on the updated rack profile.

10. The method of claim 8, wherein the management station comprises a central management station for a data center management and a building management station for an asset management.

11. A system for managing a plurality of rack devices, the system comprising:
    a rack comprising a plurality of Uspaces configured to host the plurality of rack devices comprising physical devices and logical devices;
    a plurality of peripheral devices respectively associated with the plurality of Uspaces, each peripheral device of the plurality of peripheral devices configured to monitor the corresponding Uspace or one of the rack devices installed in the corresponding Uspace; and
    a controller, disposed within a rack hosting a plurality of rack devices comprising physical devices and logical devices, comprising:
       a machine readable medium storing program instructions; and
       a processing resource operably coupled to the machine readable medium, wherein the processing resource executes the program instructions to:
          generate, by a unique identifier generator of the controller, a first unique identifier comprising a first set of individual unique identifiers corresponding to a rack profile of the rack hosting the plurality of rack devices the rack, wherein the rack profile is based on information identifying the plurality of rack devices and a rack topology comprising respective locations at which the plurality of rack devices is hosted within the rack;

receive, by a compliance check and enforcement engine of the controller, updated information identifying the plurality of rack devices and the rack topology from the plurality of peripheral devices;

receive, by the unique identifier generator of the controller, the updated information from the compliance check and enforcement engine;

generate, by the unique identifier generator of the controller, a second unique identifier comprising a second set of individual unique identifiers based on the updated information;

determine, by the compliance check and enforcement engine of the controller, whether a variation in the rack profile has occurred based on a comparison of the first and second sets of individual unique identifiers, wherein the variation corresponds to one or more of the following events:

an opening of a door of the rack, a variation in temperature, power consumption, or network bandwidth usage in at least one rack device of the plurality of rack devices, or an addition or removal of at least one rack device of the plurality of rack devices; and on condition of determining that the variation in the rack profile occurred, generate, by an alert engine of the controller, an alert signal in the rack.

12. The system of claim 11, wherein the unique identifier generator of the controller is to:

generate an individual unique identifier for each rack device occupying an Uspace of the rack, an empty Uspace of the rack, and the rack topology; and aggregate the individual unique identifier to generate the first unique identifier.

13. The system of claim 11, wherein the compliance check and enforcement engine of the controller is to receive the updated information in response to at least one of an event, a scheduled interval, or a random interval.

14. The system of claim 13, wherein the compliance check and enforcement engine of the controller is to further, in response to determining that variation in the rack profile occurred, correlate the rack profile with the updated information to identify whether the variation occurred in at least one of the physical devices, the logical devices, or the rack topology.

15. The system of claim 11, wherein the compliance check and enforcement engine of the controller is to determine the variation in the rack profile during one or more of a transit phase of the rack or an operational phase of the rack.

16. The system of claim 11, wherein the compliance check and enforcement engine of the controller is to further deny power supply to the rack, in response to determining that of the variation in the rack profile occurred.

17. The system of claim 11, wherein the alert engine of the controller is to further communicate the alert signal to a management station.

18. The system of claim 17, wherein the unique identifier generator of the controller is to further:

receive an updated rack profile from the management station, wherein the management station authorizes the updated rack profile based on user input corresponding to modifications to at least one of the physical device, the logical device, or the rack topology; and generate a third unique identifier based on the updated rack profile.

19. A non-transitory machine readable medium storing instructions executable by a processing resource in a controller disposed within a rack hosting and managing a plurality of rack devices comprising physical devices and logical devices, the instructions comprising:

instructions to generate, by a unique identifier generator of a controller disposed within a rack hosting the plurality of rack devices comprising physical devices and logical devices, a first unique identifier comprising a first set of individual unique identifiers corresponding to a rack profile of the rack hosting the plurality of rack devices, wherein the rack profile is based on information identifying the plurality of rack devices and a rack topology comprising respective locations at which the plurality of rack devices is hosted within the rack;

instructions to receive, by a compliance check and enforcement engine of the controller, updated information identifying the plurality of rack devices and the rack topology from a plurality of peripheral devices disposed within the rack, wherein the updated information is obtained by the peripheral devices monitoring conditions of the plurality of rack devices and the rack topology;

instructions to receive, by the unique identifier generator of the controller, the updated information from the compliance check and enforcement engine;

instructions to generate, by the unique identifier generator of the controller, a second unique identifier comprising a second set of individual unique identifiers based on the updated information;

instructions to determine, by the compliance check and enforcement engine of the controller, a variation in the rack profile based on a comparison of the first and second sets of individual unique identifiers, wherein the variation corresponds to one or more of the following events:

an opening of a door of the rack, a variation in temperature, power consumption, or network bandwidth usage in at least one rack device of the plurality of rack devices, or an addition or removal of at least one rack device of the plurality of rack devices; and instructions to generate, by an alert engine of the controller, an alert signal in the rack, in response to the determination of the variation in the rack profile.

20. The non-transitory machine readable medium of claim 19, wherein instructions further comprises:

instructions to generate, by the unique identifier generator of the controller, an individual unique identifier for each rack device occupying an Uspace of the rack, an empty Uspace of the rack, and the rack topology; and instructions to aggregate, by the unique identifier generator of the controller, the individual unique identifier to generate the first unique identifier.

* * * * *